(12) United States Patent
Sen et al.

(10) Patent No.: US 11,580,263 B2
(45) Date of Patent: Feb. 14, 2023

(54) DATA CONTENT CHAIN OF CUSTODY AND INTEGRITY VALIDATION

(71) Applicant: Verizon Patent and Licensing Inc., Arlington, VA (US)

(72) Inventors: Indraneel Sen, Livingston, NJ (US); Weimin Liu, Chatham, NJ (US); Yuk Lun Li, Morganville, NJ (US); Mohammad Raheel Khalid, Budd Lake, NJ (US); Ravi Sharma, Freehold, NJ (US); Dan Sun, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 652 days.

(21) Appl. No.: 16/686,347

(22) Filed: Nov. 18, 2019

(65) Prior Publication Data

US 2021/0150062 A1 May 20, 2021

(51) Int. Cl.
*G06F 21/64* (2013.01)
*H04L 9/32* (2006.01)
*H04L 9/00* (2022.01)

(52) U.S. Cl.
CPC ............ *G06F 21/64* (2013.01); *H04L 9/3226* (2013.01); *H04L 9/50* (2022.05); *H04L 2209/04* (2013.01)

(58) Field of Classification Search
CPC ......... G06F 21/64; H04L 9/3226; H04L 9/50; H04L 2209/04
See application file for complete search history.

(56) References Cited

U.S. PATENT DOCUMENTS

| | | | |
|---|---|---|---|
| 2015/0058623 A1* | 2/2015 | Taylor | G06F 21/64 713/165 |
| 2020/0159891 A1* | 5/2020 | Patel | G06F 21/16 |

\* cited by examiner

*Primary Examiner* — Hee K Song

(57) ABSTRACT

A device obtains previously created data content. The device unmasks and extracts one or more chain of custody blocks stored in association with the data content. The one or more chain of custody blocks includes chain of custody data identifying who, when, where, and, with what hardware and/or software, created or edited the data content. The device analyzes the one or more chain of custody blocks and validates an origination of the data content based on the analysis of the one or more chain of custody blocks.

20 Claims, 14 Drawing Sheets

DATA CONTENT CHAIN OF CUSTODY AND INTEGRITY VALIDATION

BACKGROUND

Various different types of data content may be downloaded, delivered, and/or streamed from remote devices or servers. A device, such as a "smart" phone, may request the downloading or streaming of the data content from a remote device or server across a network, such as the cellular network and/or the Internet. The data content may include, for example, a video clip, an audio file, or one or more images. Upon receipt of the data content, a user at the receiving device may display the content via, for example, a screen of the device. In the case of a video clip, display of the data content may include frame by frame playback of the video clip.

DETAILED DESCRIPTION OF THE PREFERRED EMBODIMENTS

Figure 1:
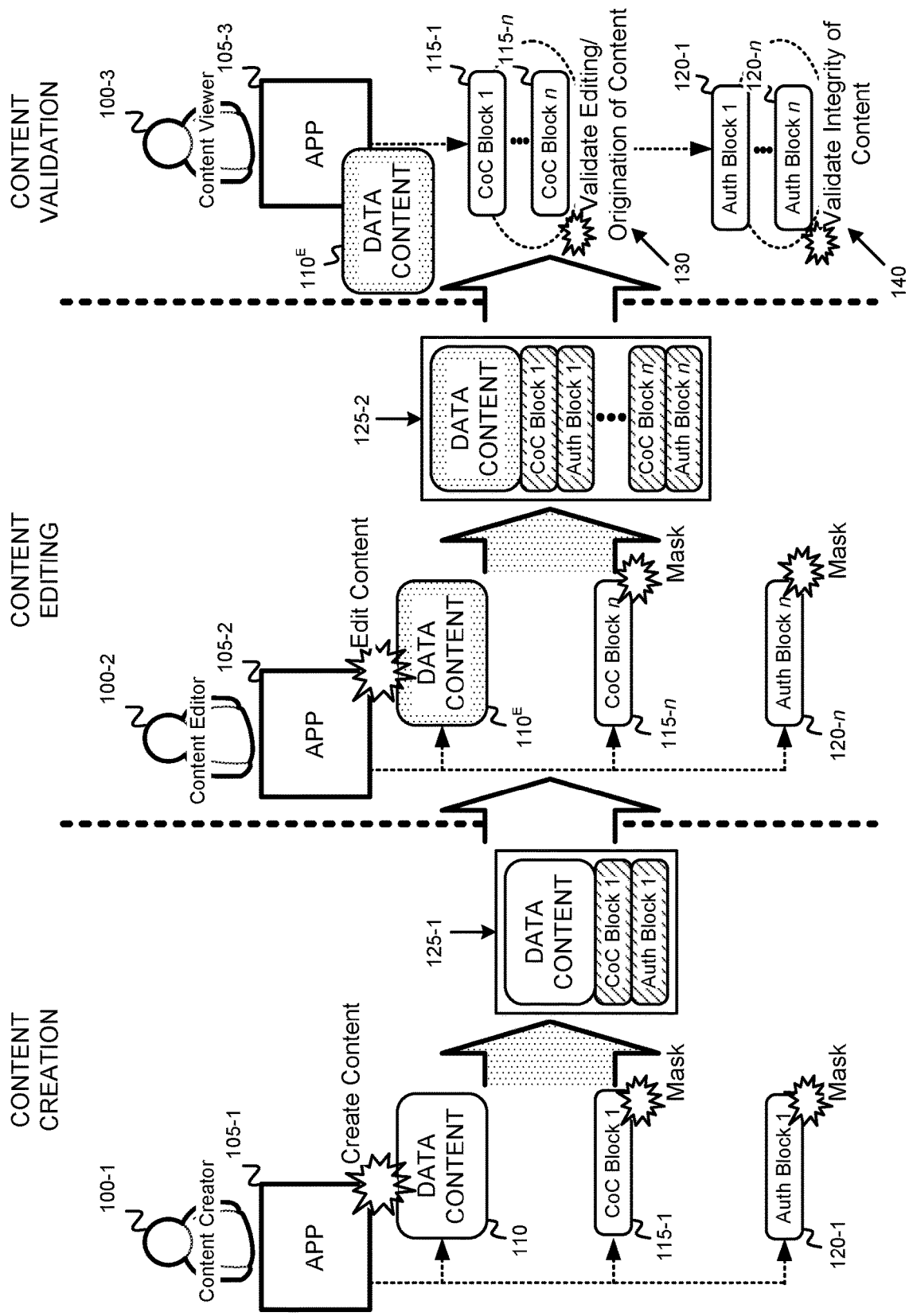
FIG. 1 is a diagram that depicts an overview of the validation of the origination, editing, and/or integrity of data content according to exemplary embodiments described herein.

The following detailed description refers to the accompanying drawings. The same reference numbers in different drawings may identify the same or similar elements. The following detailed description does not limit the invention.

Data content, such as video clips, audio clips, or images, may originate from questionable sources, or may be modified in an unauthorized manner. Therefore, it may be desirable for each device that receives particular data content to be able to validate the origination of the data content and/or determine any modifications made to the data content after its original creation. It may additionally be desirable for the device to determine the integrity of the data content relative to a previous version or versions of the data content. Existing devices that download, or receive delivered or streaming data content, from external sources do not have the capability of verifying the origination, editing, and integrity of the received data content.

Embodiments described include functionality for generating chain of custody block chains and authentication block chains associated with creating, editing, and/or exercising custody of data content. When data content is created at a device using an application, context data may be obtained by the application and inserted in a chain of custody block. The context data may include data describing who created the data content and when, where, and, with what hardware and/or software, the data content was created. When the data content is subsequently edited at a device using the application, additional or updated context data may also be obtained by the application, that may include data describing who, when, where, and with what hardware and/or software, the data content was edited, and may further include data describing what editing operations were performed upon the data content. When a device exercises custody over the data content (e.g., downloads, or receives, the data content), context data may further be obtained by the application that may include data describing who, when, where, and associated with what hardware and/or software, exercised custody of the data content. The obtained context data may be inserted in a series of different chain of custody blocks upon each occurrence of data content creation, editing, and/or exercise of custody involving the data content.

Error detection codes may additionally be generated for the data content upon each occurrence of data content creation, editing, and/or the exercise of custody. The generated error detection codes may be inserted in a series of different authentication blocks upon each occurrence of the data content creation, editing, and/or the exercise of custody. The resulting chain of custody block chain, and the authentication block chain, for the data content may then be masked and included in a block of data that includes the created data content for delivery to another device or server, or for local or remote storage for subsequent retrieval by another device or server. As described in further detail herein, the chain of custody block chain, and the authentication block chain, may be retrieved from the data content and the context data and error detection codes, associated with the creating, editing, and/or exercise of custody of the data content, may be analyzed to validate an origination, editing, and/or integrity of the data content.

FIG. 1 is a diagram that depicts an overview of the validation of the origination, editing, and/or integrity of data content according to exemplary embodiments described herein. The data content may include, for example, video, (e.g., a video clip), audio (e.g., an audio clip), an image or collection of images, or other types of data (e.g., packets in a stream of packets). Each time the data content is processed (e.g., created, edited, locally stored, etc.) by a device associated with a user, a chain of custody (CoC) block is created that may identify: 1) the user that created, modified, or exercised custody over, the data content, 2) when the data content was created, modified or in custody, 3) where the data content was created, modified or in custody; 4) the hardware and/or application used to create, modify, or exercise custody over, the data content; and/or 5) what modifications (if any) were performed on the data content. The CoC blocks may subsequently be used by other users to validate the origination of the data content. Additionally, each time the data content is processed, an authentication block is created that includes error detection codes generated based on the existing data content at the time of processing. The chain of authentication blocks may be subsequently used by other users to validate the integrity of the data content. In some implementations, the ID of the party that created, edited, or exercised custody over the data content 110 may be identified with a unique identifier that may be digitally signed by the party using the party's private key of a public/private key pair.

As shown in the left portion of FIG. 1, a first user 100-1 may use an application (app) 105-1 at a first device (not shown) to create data content 110. In one implementation, the app 105-1 may include a video app that generates a video clip in conjunction with a camera. In another implementation, the app 105-1 may include an audio app that generates an audio file based on audio data received from a microphone. In yet another implementation, the app 105-1 may include an image app that generates one or more images based on image data received from a camera. App 105-1 may obtain context data associated with the creation of data content 110 and generate a CoC block 115-1. The context data may include data associated with who, when, where, and, with what hardware, created the data content 110.

App 105-1 may additionally generate error detection codes based on the current data contained within content 110. The error detection codes may include, for example, checksums, Cyclical Redundancy Check (CRC) codes, or hash codes that are generated based on data content 110. For example, if data content 110 includes a video clip, then an error detection code, such as a checksum, CRC code, or hash code, may be generated for each frame of the video clip. As another example, if data content 110 includes a collection of images, then an error detection code may be generated for each image of the collection of images. App 105-1 may generate an authentication block 120-1 that includes the generated error detection codes.

Subsequent to generation of CoC block 115-1 and authentication block 120-1, app 105-1 masks block 115-1 and block 120-1 and stores them in association with data content 110 as a block 125-1 of data content. In one implementation, masking CoC block 115-1 and authentication block 120-1 may include embedding the blocks in a watermark in the data content using an existing watermarking technique. In another implementation, masking CoC block 115-1 and authentication block 120-1 may include encrypting the blocks and appending the encrypted blocks to data content 110.

As shown in the center portion of FIG. 1, a second user 100-1 may use an application (app) 105-2 at a second device (not shown) to edit the previously created data content 110. In some circumstances, the second user 100-2 may be the same user as the first user 100-1, and the first user 100-2 may use a same app 105 on a same device, or a different app 105 on a different device, to edit the previously created content 110. App 105-2 includes data content editing functionality that enables content editor 100-2 to modify the data content 110. For example, if data content 110 is a video clip, then app 105-2 includes a video editing functionality that enables content editor 100-2 to modify the video content of the video clip.

As a product of the modification of the data content 110, app 105-2 generates edited data content $110^E$. For example, if the data content 110 is a video clip, then app 105-2 generates an edited video clip. At the conclusion of the editing of the data content 110, app 105-2 may obtain context data associated with the editing of data content 110 and generate a CoC block 115-$n$. The context data may include data associated with who, when, where, and using what hardware modified the data content 110. The context data may additionally include data that identifies the modifications made to the data content $110^E$ relative to a previous version of the data content 110.

App 105-2 may additionally generate error detection codes based on the current data contained within data content $110^E$. The error detection codes may include, for example, checksums, Cyclical Redundancy Check (CRC) codes, or hash codes that are generated based on edited data content $110^E$. For example, if edited data content $110^E$ includes a video clip, then an error detection code, such as a checksum, CRC code, or hash code, may be generated for each frame of the video clip. App 105-2 may generate an authentication block 120-$n$ that includes the generated error detection codes. Subsequent to generation of CoC block 115-$n$ and authentication block 120-$n$, app 105-2 masks block 115-$n$ and block 120-$n$ and stores them in association with edited data content $110^E$ as a block 125-2 of data content. Similar to the left portion of FIG. 1 described above, masking CoC block 115-$n$ and authentication block 120-$n$ may include embedding the blocks in a watermark in the data content using an existing watermarking technique, or encrypting the blocks and appending the encrypted blocks to data content 110.

The center portion of FIG. 1 may similarly apply to a situation where a user 100-2 merely exercises custody over data content 110 without performing any editing of data content 100. In this circumstance (not shown in the center portion of FIG. 1), upon receipt of the data content 110 at a device, app 105-2 generates a CoC block 115-$n$ and an Auth block 120-$n$ similar to that described above, with the context data including data associated with who, when, where, and, with what device hardware, exercised custody over the data content 110.

As shown in the right portion of FIG. 1, a third user 100-3 (i.e., a content viewer) may use an application (app) 105-3 at a third device (not shown) to display and view data content 110. In some circumstances, the third user 100-3 may be a same user as first user 100-1 or second user 100-2, and the third user 100-3 may use a same app 105 on a same device, or a different app 105 on a different device, to view the previously created and/or edited content 110. In implementations in which the data content 110 is a video clip, app 105-3 includes a video player that may process, analyze, and display the video clip, via a video output device (not shown), to a content viewer 100-3. App 105-3 obtains data block 125-2 and unmasks CoC blocks 115-1 through 115-$n$, and Auth blocks 120-1 through 120-$n$ and extracts data content $110^E$.

App 105-3 validates 130 the originating and/or editing of data content 110 based on the unmasked CoC blocks 115-1 through 115-$n$. Validating the origination of the data content 110 may include retrieving the unique party IDs from the CoC blocks 115-1 through 115-$n$ and verifying a validity of each of the retrieved party IDs. Additionally, or alternatively, a digital signature associated with each unique party ID may be retrieved, and the public key of the party identified by the party ID may be used to verify that the party's ID is authentic. Validating the editing of the data content 110 may include retrieving the context data from the CoC blocks 115-1 through 115-$n$ and analyzing the context data, including analyzing the data describing the data content editing performed. App 105-3 may notify content viewer 100-3 of a result of the origination/editing validation. If the origination and editing of the data content 110 is successfully validated, then app 105-3 notifies content viewer 100-3 of the successful validation. If validation of the origination and editing of the data content 110 fails, then app 105-3 notifies content viewer 100-3 of the origination and editing validation failure.

App 105-3 further validates 140 the integrity of the data of data content 110. Validating the integrity of the data of data content 110 may include retrieving the error detection codes from each of the authentication blocks 120-1 through 120-$n$ and comparing the error detection codes to identify any discrepancies. Error detection code comparison may include comparing error detection codes generated based on the data content 110 or $110^E$ currently being handled by app 105-3 and the error detection codes retrieved from authentication blocks 120-1 through 120-$n$. If the comparison of error detection codes indicates a discrepancy, then app 105-3 determines that the validation of the integrity of the data content 110 has failed. App 105-3 may notify content viewer 100-3 of a result of the data integrity validation. For example, if the error detection codes contained in authentication block 120-$n$ do not match the error detection codes generated by app 105-3, using a same error detection code generation algorithm, based on the data content 110 currently stored or being processed by app 105-3, then app 105-3 may determine that the integrity validation has failed.

Figure 2A:
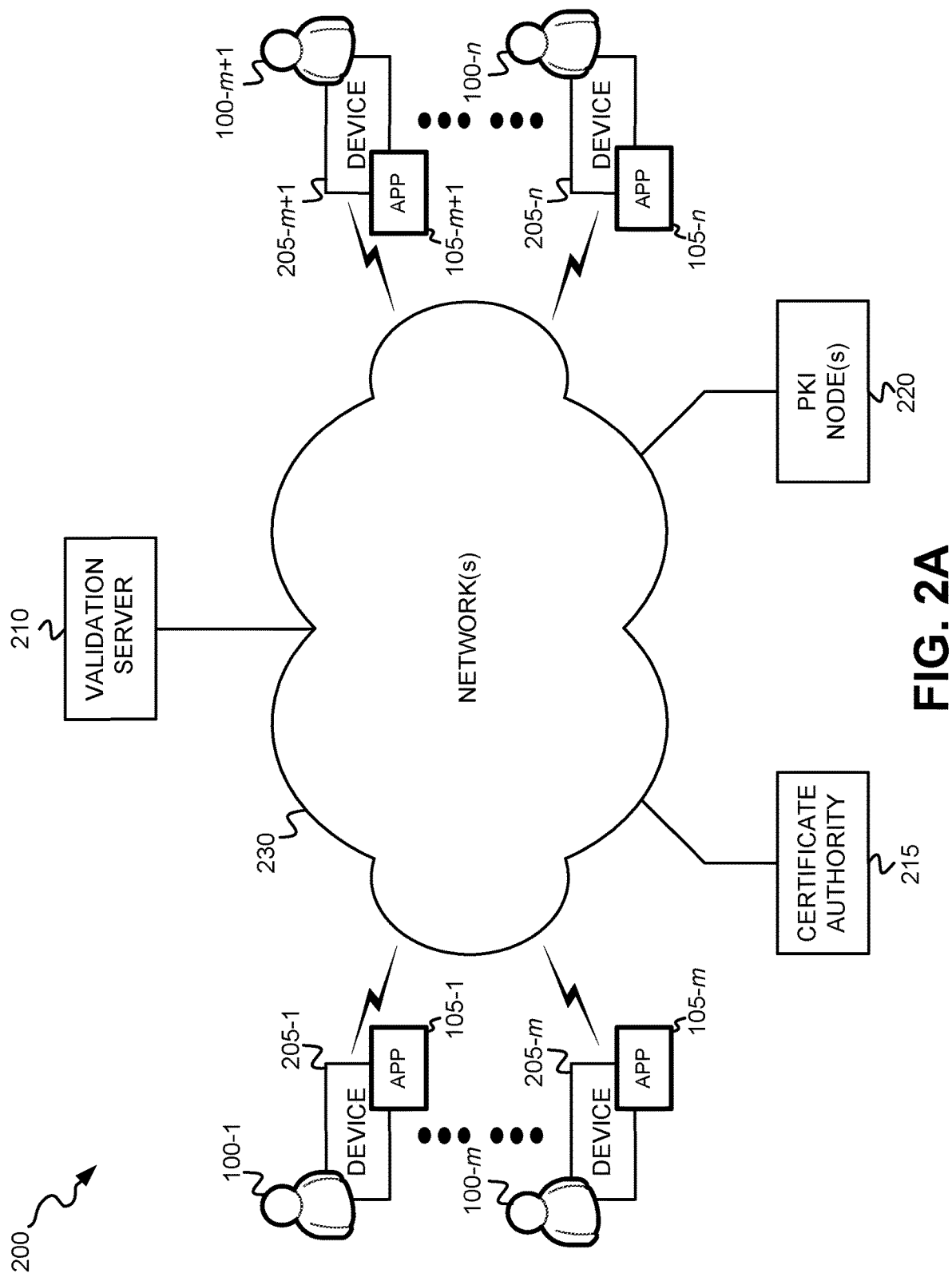
FIG. 2A depicts an exemplary network environment in which validation of a chain of custody and an integrity of data content may be performed.

FIG. 2A depicts an exemplary network environment 200 in which validation of a chain of custody and an integrity of data content may be performed. Network environment 200 may include devices 205-1 through 205-$n$, a validation server 210, a Certificate Authority 215, a PKI node(s) 220, and network 230.

Devices 205-1 through 205-$n$ (generically referred to herein as "devices 205" or "device 205") may each include any type of electronic device that includes wired and/or wireless communication capabilities. The devices 205 may each include, for example, a desktop, laptop, palmtop or tablet computer; a cellular telephone (e.g., a "smart" phone); a personal digital assistant (PDA); a music player (e.g., a digital audio player); a video player; a digital camera; an Internet of Things (IoT) or Machine-to-Machine (M2M) device; an audio speaker(s) (e.g., a "smart" speaker); a "smart" television; or a video gaming device. A respective user 100 may carry, use, administer, and/or operate each device 205. For example, as shown in FIG. 2A, a user 100-1 may use device 205-1, a user 100-2 may use device 205-2, a user 100-$n$ may use device 205-$n$, etc.

Validation server 210 may include one or more network devices that may, in some circumstances, act as a relay node for delivering (e.g., streaming) data content from a first device 205 to a second device 205 across a network to perform origination, editing, and integrity validation of the data content based on CoC block chains and Authentication block chains associated with the data content.

Certificate authority 215 includes one or more network devices that act as a node in a Public Key Infrastructure (PKI) system for generating and issuing a digital identity certificate requested by a user 100 at a device 205.

PKI node(s) 220 includes one or more other nodes of the PKI system that, in conjunction with certificate authority 215, bind user public keys with respective user identities and assist in the creation, management, distribution, storage and revocation of digital identity certificates. PKI node(s) 220 may include, for example, a registration authority (RA) that verifies the identity of users requesting information from the certificate authority.

Network 230 includes one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless Public Land Mobile Networks (PLMNs). The PLMN(s) may include a Code Division Multiple Access (CDMA) 2000 PLMN, a Global System for Mobile Communications (GSM) PLMN, a Long-Term Evolution (LTE) PLMN and/or other types of PLMNs not specifically described herein.

The configuration of the components of network environment 200 depicted in FIG. 2A is for illustrative purposes only. It should be understood that other configurations may be implemented. Therefore, network environment 200 may include additional, fewer and/or different components, that may be configured differently, than depicted in FIG. 2A.

Figure 2B:
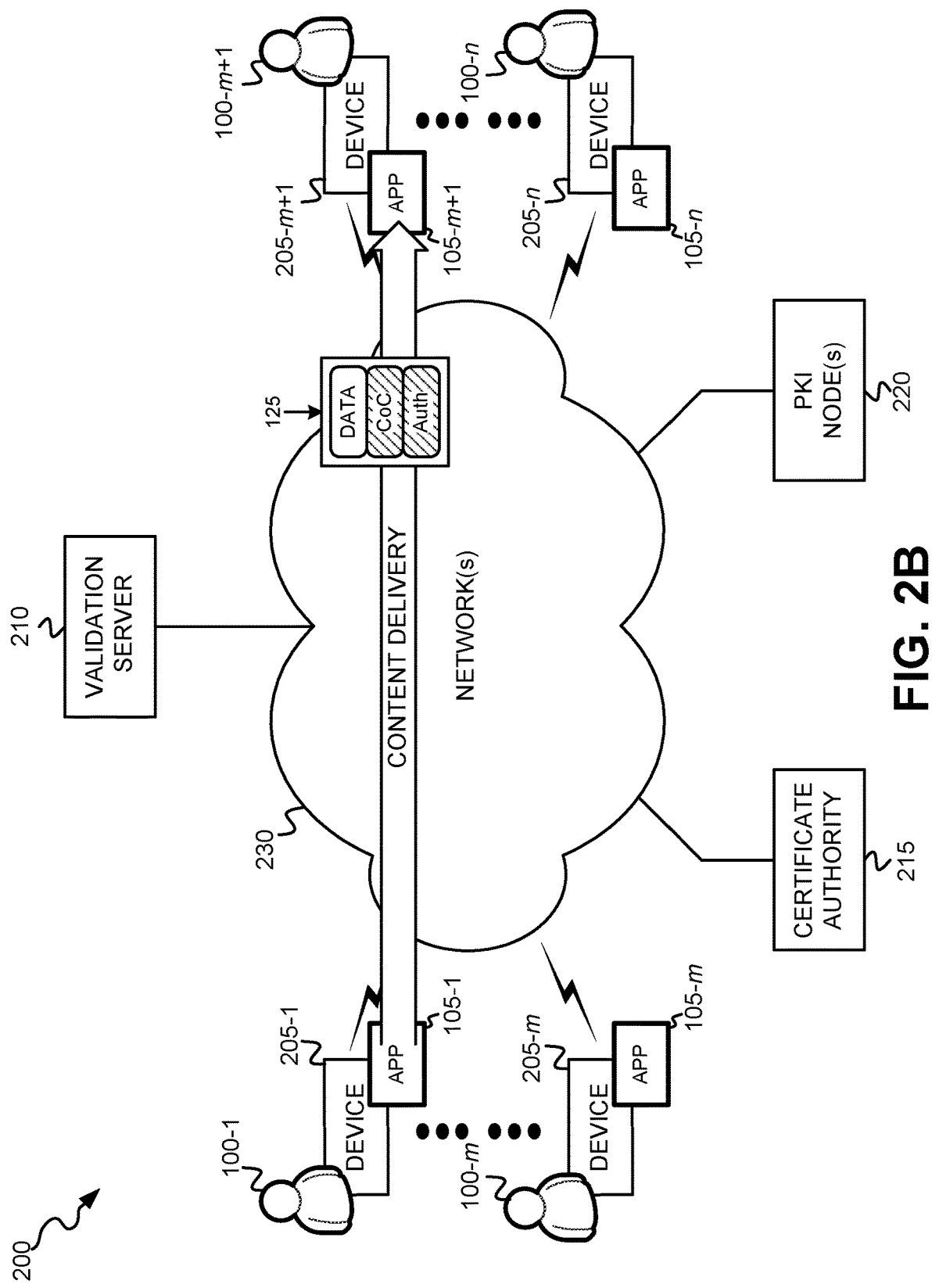
FIG. 2B illustrates an example of delivery of a block of data content from a first device to a second device across the network(s) of FIG. 2A.

FIG. 2B illustrates an example of delivery of a block 125 of data content from a first device 205-1 to a second device 205-$m$+1 across network(s) 230. Subsequent to creation of data content 110, such as shown in the left portion of FIG. 1, app 105-1 at device 205-1 may engage in content delivery with another device, such as device 205-$m$+1. The content delivery may include transmitting or streaming the block 125 of data content 110 across network(s) 230 to a destination device. For example, referring to FIG. 1, a content creator 100-1 may cause app 105-1 to stream block 125-1 across network(s) 230 to a device associated with content editor 100-2, or to a device associated with content viewer 100-1.

Figure 2C:
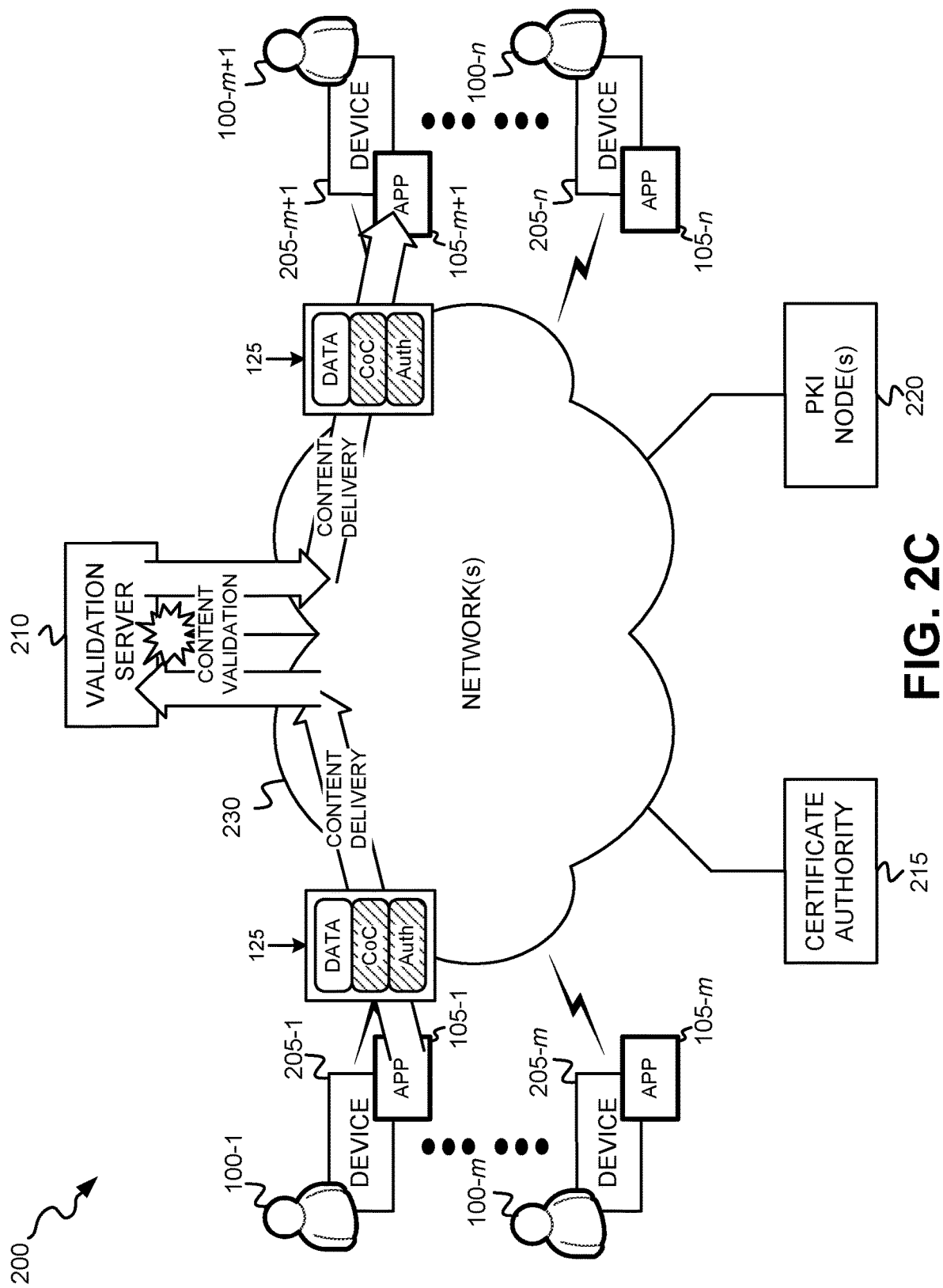
FIG. 2C illustrates an example of data content chain of custody and integrity validation that may be performed by an intermediate device when data content is delivered from a first device to a second device across the network(s) of FIG. 2A.

FIG. 2C illustrates an example of data content origination, editing, and integrity validation that may be performed by an intermediate device when data content 110 is delivered from a first device to a second device across network(s) 230. In the example shown, when a data content block(s) 125, containing data content 110, is sent between device 205-1 and device 205-$m$+1, an intermediate validation server 210 receives the data content block(s) 125 from device 205-1, performs origination, editing, and/or integrity validation upon the block(s) 125 such as described below with respect to FIGS. 10 and 11, and then forwards the validated content to the destination device 205-$m$+1. Validation server 210 may include one or more trusted network devices. Validation server 210 may additionally send a notification to user 100-$m$+1 at device 205-$m$+1 of a result of the CoC and integrity validation. In some implementations, validation server 210 may process and remove the CoC and Auth blocks from data block(s) 125 before forwarding the validated data content to the destination device. In other implementations, validation server 210 may forward the data block(s) 125 to the destination device with the masked CoC block(s) and Auth block(s) intact within the block(s) 125.

Figure 2D:
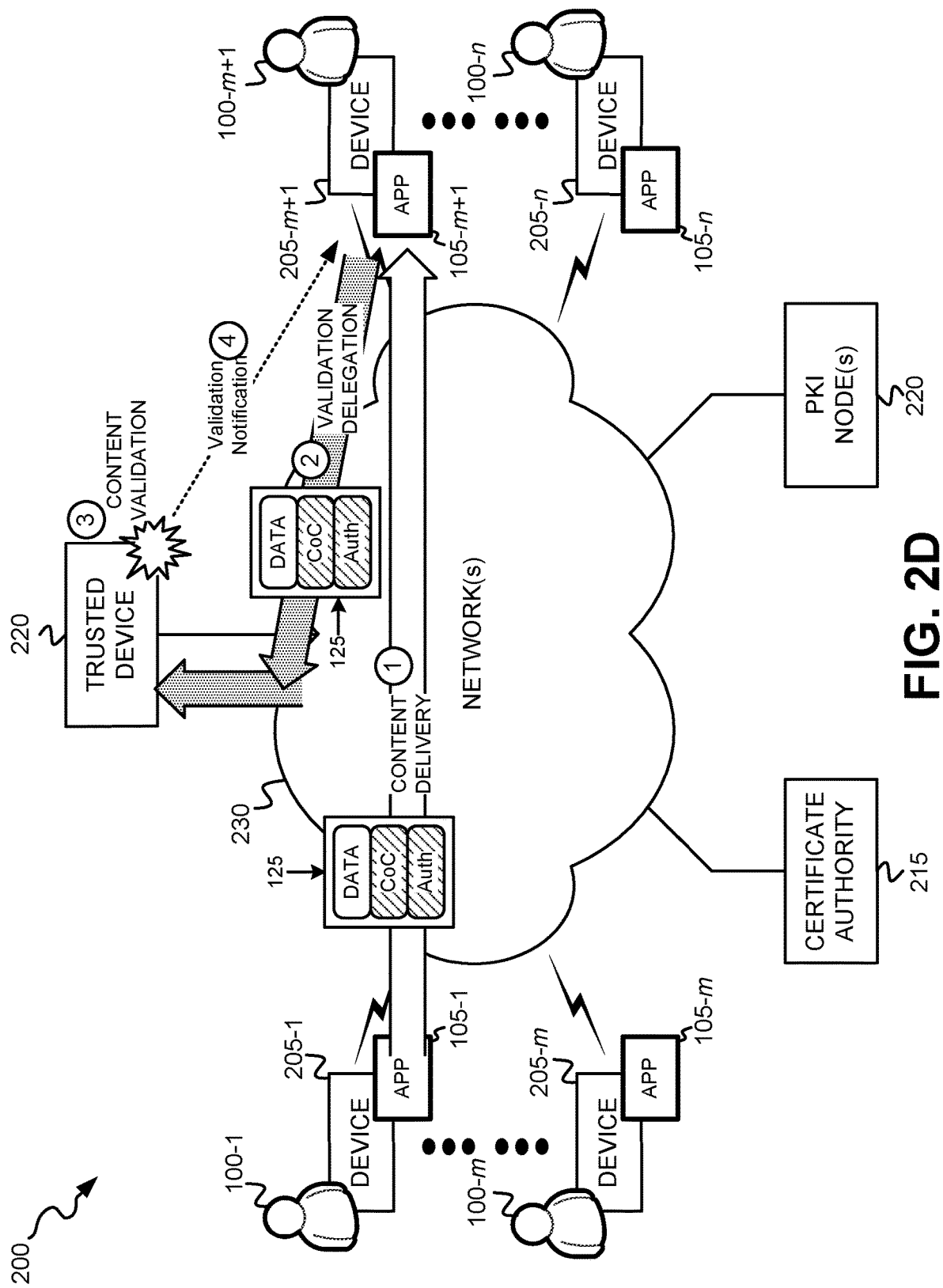
FIG. 2D illustrates an example of the delegation of the validation of data content to a trusted device.

FIG. 2D illustrates an example of the delegation of data content validation, as described herein, to a trusted device. In the example shown, when a data content block(s) 125, containing data content 110, a CoC block(s) 115, and an Auth block(s) 120, is delivered (identified with a "1" within a circle) from device 205-1 to device 205-$m$+1 (e.g., transmitted across network(s) 230), the receiving device 205-*m*+1 may forward (identified with a "2" within a circle) the data content block(s) 125 to a trusted device 220 for content validation, such as described below with respect to FIGS. 10 and 11. Trusted device 220 may include, for example, a trusted server that performs content validation at the request of remote devices. Upon receipt of data content block(s) 125, trusted device 200 performs content validation (identified with a "3" within a circle), including origination, editing and/or integrity validation, upon the block(s) 125. Trusted device 220 may send a validation notification (identified with a "4" within a circle) to user 100-*m*+1 at device 205-*m*+1 that includes a result of the origination, editing, and/or integrity validation. For example, the validation notification may include an indication of content validation failure or content validation success.

Figure 3:
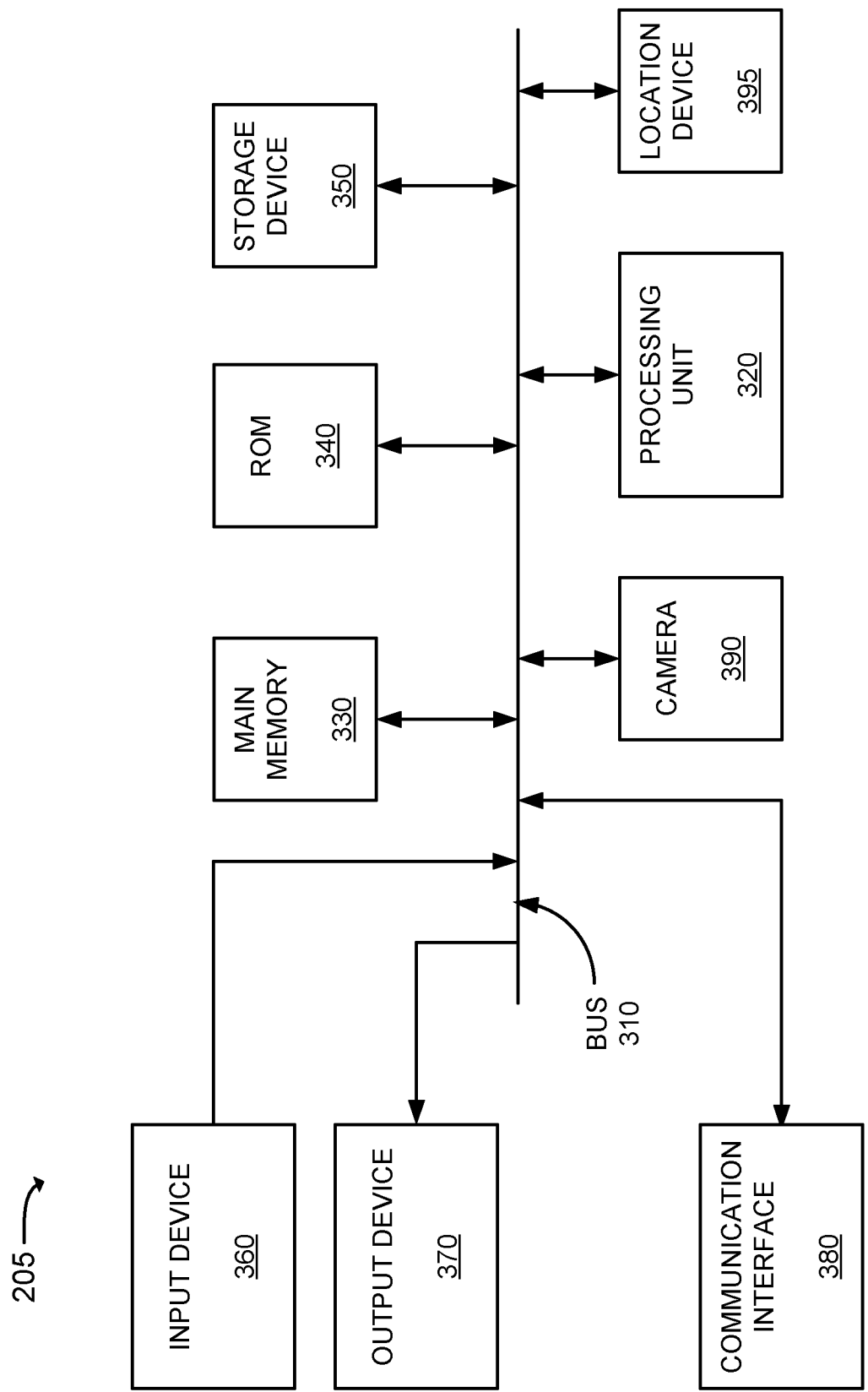
FIG. 3 is a diagram that depicts exemplary components of a device of FIG. 2.

FIG. 3 is a diagram that depicts exemplary components of a device 205. Validation server 210, certificate authority 215, and PKI node(s) 220 may include or more network devices that each include components that are the same as, or similar to, the device 205 shown in FIG. 3, arranged in an identical configuration, or in a similar configuration, to that shown in FIG. 3. Device 300 may include a bus 310, a processing unit 320, a main memory 330, a read only memory (ROM) 340, a storage device 350, an input device 360, an output device 370, a communication interface 380, a camera 390, and a location device 395. Bus 310 may include a path that permits communication among the other components of device 300.

Processing unit 320 may include one or more processors or microprocessors which may interpret and execute stored instructions associated with one or more processes, or processing logic that implements the one or more processes. In some implementations, processing unit 320 may include, for example, programmable logic such as Field Programmable Gate Arrays (FPGAs) or accelerators. Processing unit 320 may include software, hardware, or a combination of software and hardware for executing the processes described herein. Main memory 330 may include a random access memory (RAM) or another type of dynamic storage device that may store information and, in some implementations, instructions for execution by processing unit 320. ROM 340 may include a ROM device or another type of static storage device (e.g., Electrically Erasable Programmable ROM (EEPROM)) that may store static information and, in some implementations, instructions for use by processing unit 320. Storage device 350 may include a magnetic, optical, and/or solid state (e.g., flash drive) recording medium and its corresponding drive. Main memory 330, ROM 340 and storage device 350 may each be referred to herein as a "non-transitory computer-readable medium" or a "non-transitory storage medium." The process/methods set forth herein can be implemented as instructions that are stored in main memory 330, ROM 340 and/or storage device 350 for execution by processing unit 320.

Input device 360 may include one or more devices that permit an operator to input information to network device 300, such as, for example, a keypad or a keyboard, a display with a touch sensitive panel, voice recognition and/or biometric mechanisms, etc. Output device 370 may include one or more devices that output information to the operator, including a display, a speaker, etc. Input device 360 and output device 370 may, in some implementations, be implemented as a user interface (UI) that displays UI information and which receives user input via the UI. Communication interface 380 may include one or more transceivers that enable device 205 to communicate with other devices and/or systems. For example, communication interface 380 may include one or more wired or wireless transceivers for communicating via network(s) 230. Camera 390 includes a camera device, and associated hardware, for generating still images and/or video. Camera 390 may be used, for example, to create video clips in conjunction with audio recorded by a microphone of input device 360. Location device 395 determines a location of device 205. In one implementation, location device 395 may include a Global Positioning System (GPS) device that determines a geolocation of device 205 based on received GPS signals.

Device 205 may perform certain operations or processes, as may be described herein. Device 205 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 205 illustrated in FIG. 3 is for illustrative purposes only. Other configurations may be implemented. Therefore, device 205 may include additional, fewer and/or different components, arranged in a different configuration, than depicted in FIG. 3.

Figure 4:
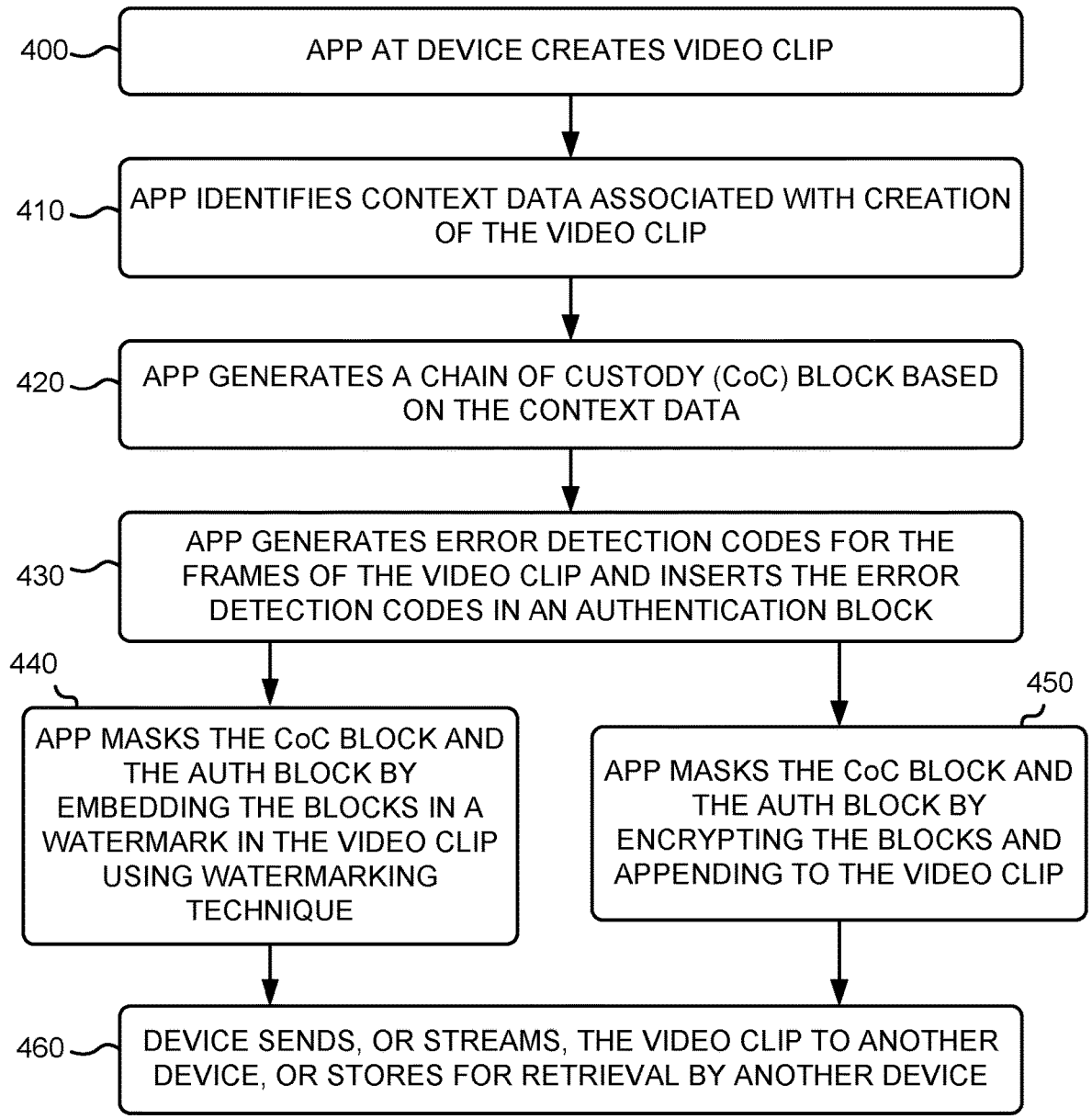
FIG. 4 is a flow diagram that illustrates an exemplary process for generating chain of custody and authentication blocks during original creation of data content.

FIG. 4 is a flow diagram that illustrates an exemplary process for generating chain of custody and authentication blocks during original creation of data content 110. The exemplary process of FIG. 4 may be implemented by an app 105 executed by a device 205. Though the process of FIG. 4 describes the data content 110 as being a video clip, the data content 100 may alternatively include images, audio files, or other types of data content (e.g., a stream of packets). The exemplary process of FIG. 4 may be executed for each video clip created by app 105 at a device 205. The exemplary process of FIG. 4 is described below with reference to the graphical depiction of FIG. 5.

Figure 5:
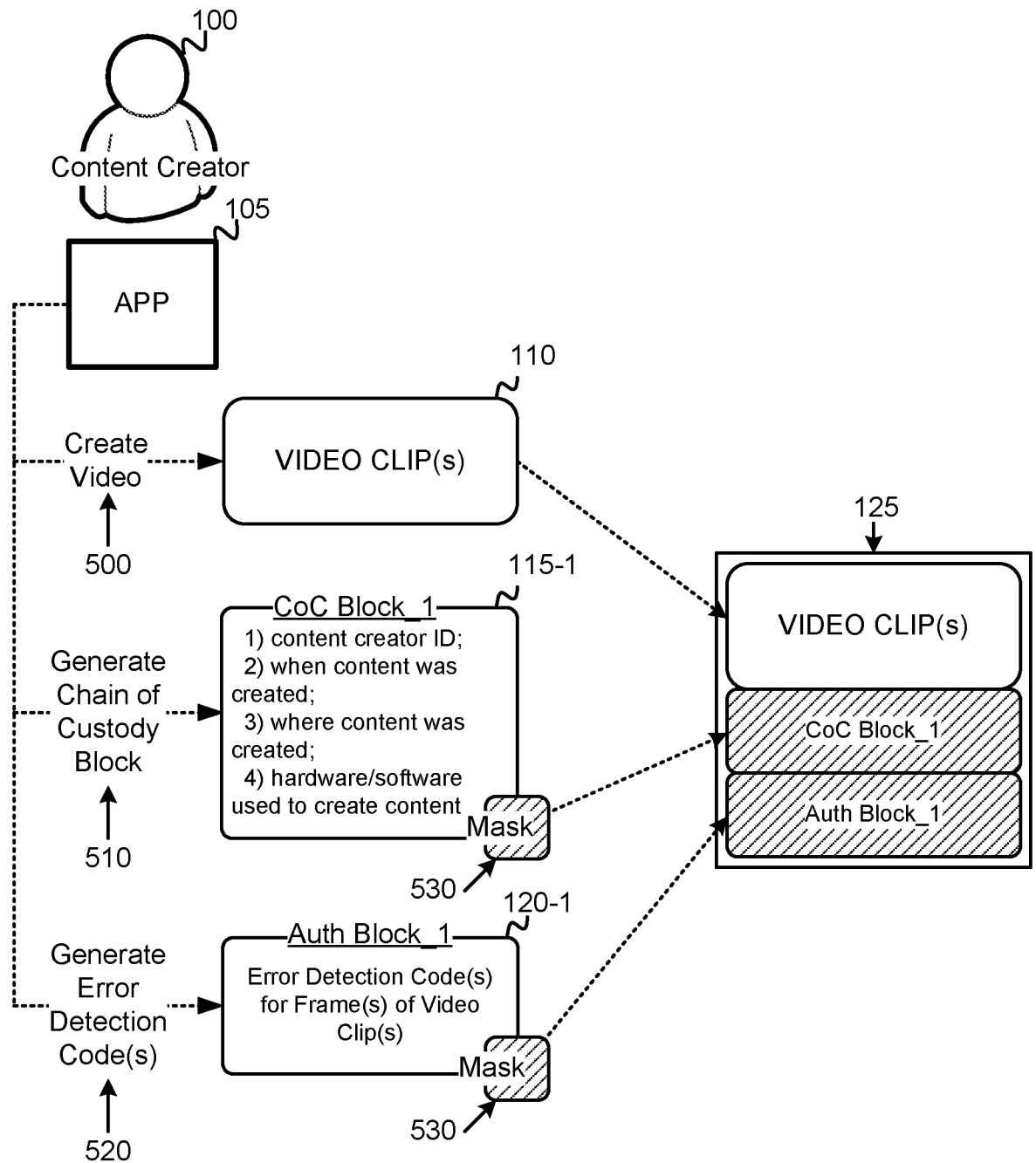
FIG. 5 graphically depicts an example of the exemplary process of FIG. 4.

The exemplary process includes an app 105 at device 205 creating a video clip (block 400). Camera 390 and a microphone of input device 360 of device 205 may be used to generate a video clip of, for example, an event or activity in the vicinity of device 205. Alternatively, app 105 may include functionality for generating a computer graphics and animation video clip. FIG. 5 depicts content creator 100, using app 105, creating 500 data content 110 that includes a video clip(s).

App 105 identifies context data associated with the creation of the video clip (block 410). In one implementation, the context data may include data describing who created the data content and when, where, and, with what hardware and/or software, the data content was created. For example, the context data associated with data content creation may include the following attributes:

1) an identifier (ID) of the party that created the video clip (i.e., the user that owns, operates, and/or administers device 205 used to create the video clip);

2) an identification of when the video clip was created;
3) an identification of where the video clip was created; and/or
4) an indication of what hardware and/or software was used to create the video clip. In other implementations, additional or different context data, than that described above, including one or more other attributes associated with creating the data content, may be identified by app 105. Subsequent to creation of the data content (e.g., a video clip), app 105 obtains the context data described above. For example, the ID of the user currently using device 205 may be locally stored at device 205 and may be retrieved from memory. The current date and time, identifying when the video clip was created, may be retrieved from an internal clock at device 205, or retrieved from an external source via network(s) 230. Location device 395 may determine a location (e.g., geolocation) of device 205 to identify where the video clip was created. App 105 may retrieve hardware identifying information for device 205 from local memory. The hardware identifying information may include, for example, a model number of device 205, an identifier associated with camera 390, etc. Other types of hardware and/or software may be identified in the context data, such as, for example, the operating system (e.g., Android™) of device 205.

App 105 generates a chain of custody (CoC) block based on the context data obtained in block 410 (block 420). App 105 may code the context data, of block 410, and insert the coded context data into a CoC data block. FIG. 5 shows app 105 generating 510 a CoC block 115-1 that includes the context data obtained in block 410.

App 105 generates error detection codes for the frames of the video clip and inserts the error detection codes in an authentication (Auth) block (block 430). Various different error detection code generating algorithms may be used consistent with embodiments described herein. For example, checksum, cyclical redundancy check (CRC), or hash code algorithms may be used for generating error detection codes for the frames of the created video clip. Other types of error detection codes may, however, be alternatively used instead of checksum, CRC, or hash codes. A checksum, CRC, or hash code may, for example, be generated for each frame of the created video clip. App 105 then inserts the generated error detection codes for the video clip into the Auth block. FIG. 5 shows app 105 generating 520 error detection codes and inserting the generated codes in an Auth block 120-1.

In one optional implementation, app 105 masks the CoC block and the Auth block by embedding the blocks in a digital watermark in the video clip using a digital watermarking technique (block 440). App 105 may, for example, embed a digital watermark, containing the CoC block and Auth block, in one or more frames of the video clip. Various different existing types of digital watermarking algorithms may be used for embedding the CoC block and the Auth block in the video clip. FIG. 5 depicts masking 530 of CoC block 115-1 and Auth block 120-1. Though not shown in FIG. 5, the masking 530 includes embedding CoC block 115-1 and Auth block 120-1 in a digital watermark in at least one frame of video clip(s) 110.

In another optional implementation, app 105 masks the CoC block and the Auth block by encrypting the blocks and appending the encrypted blocks to the video clip (block 450). App 105 may use various different existing symmetric or asymmetric cryptographic algorithms for encrypting the CoC block and the Auth block. FIG. 5 depicts masking 530 of CoC block 115-1 and Auth block 120-1 and appending the masked blocks to video clip(s) 110 to create a video data block 125.

Device 205 sends, or streams, the video clip to another device, or stores the video clip for retrieval by another device (block 460). Device 205 may, for example, stream the video clip to a destination device across network(s) 230 (such as shown in FIG. 2B). Alternatively, device 205 may store the video clip, with embedded or appended CoC and Auth blocks, in local memory, or may store the video clip in a remote storage device via network(s) 230.

Figure 6:
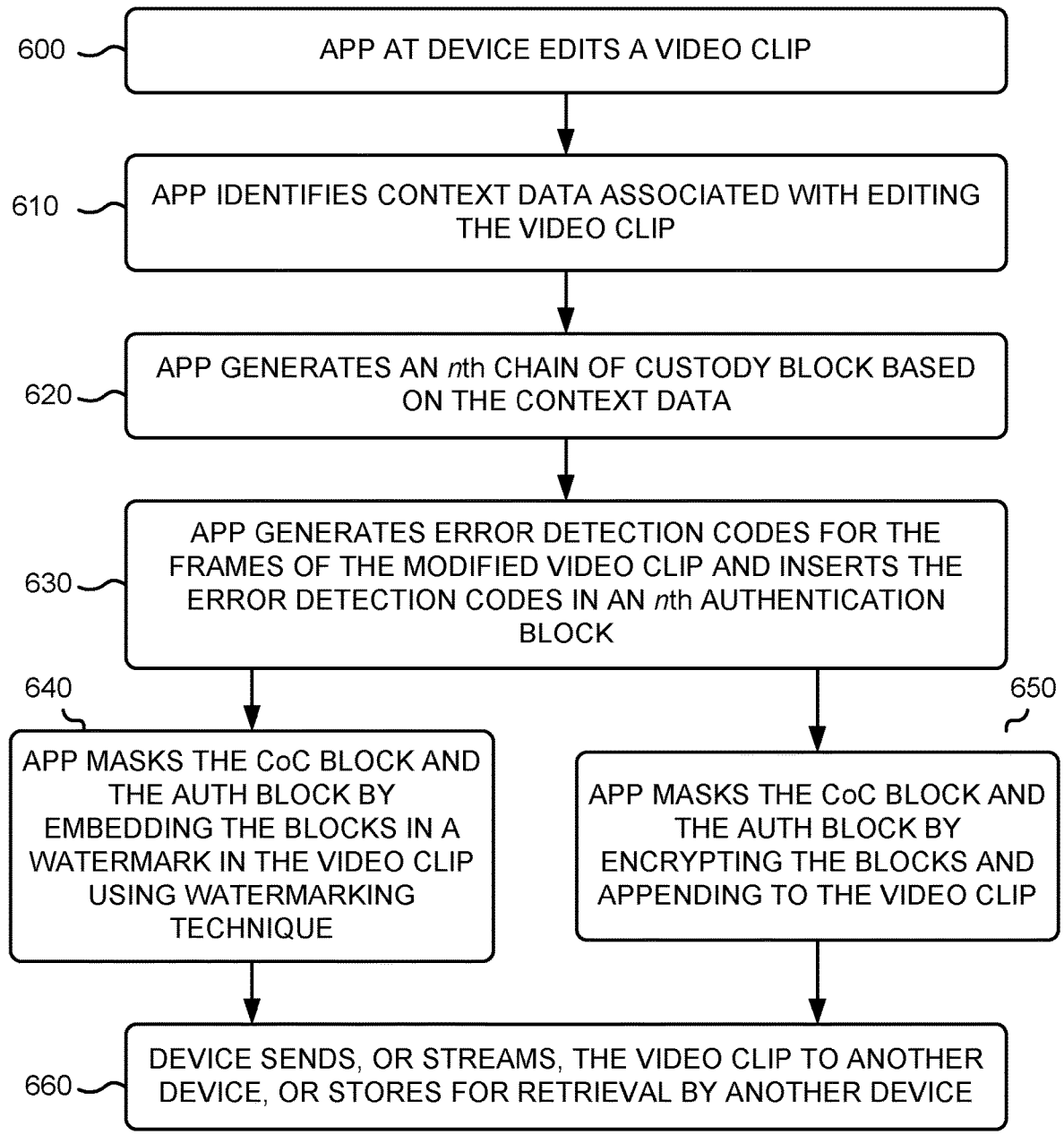
FIG. 6 is a flow diagram that illustrates an exemplary process for generating chain of custody and authentication blocks during editing of data content.

FIG. 6 is a flow diagram that illustrates an exemplary process for generating chain of custody and authentication blocks during editing of data content 110. The exemplary process of FIG. 6 may be implemented by an app 105 executed by a device 205. Though the process of FIG. 6 describes the data content 110 as being a video clip, the data content 100 may alternatively include images, audio files, or other types of data content (e.g., a stream of packets). The exemplary process of FIG. 6 may be executed for each video clip edited by app 105 at a device 205. The exemplary process of FIG. 6 is described below with reference to the graphical depiction of FIG. 7.

Figure 7:
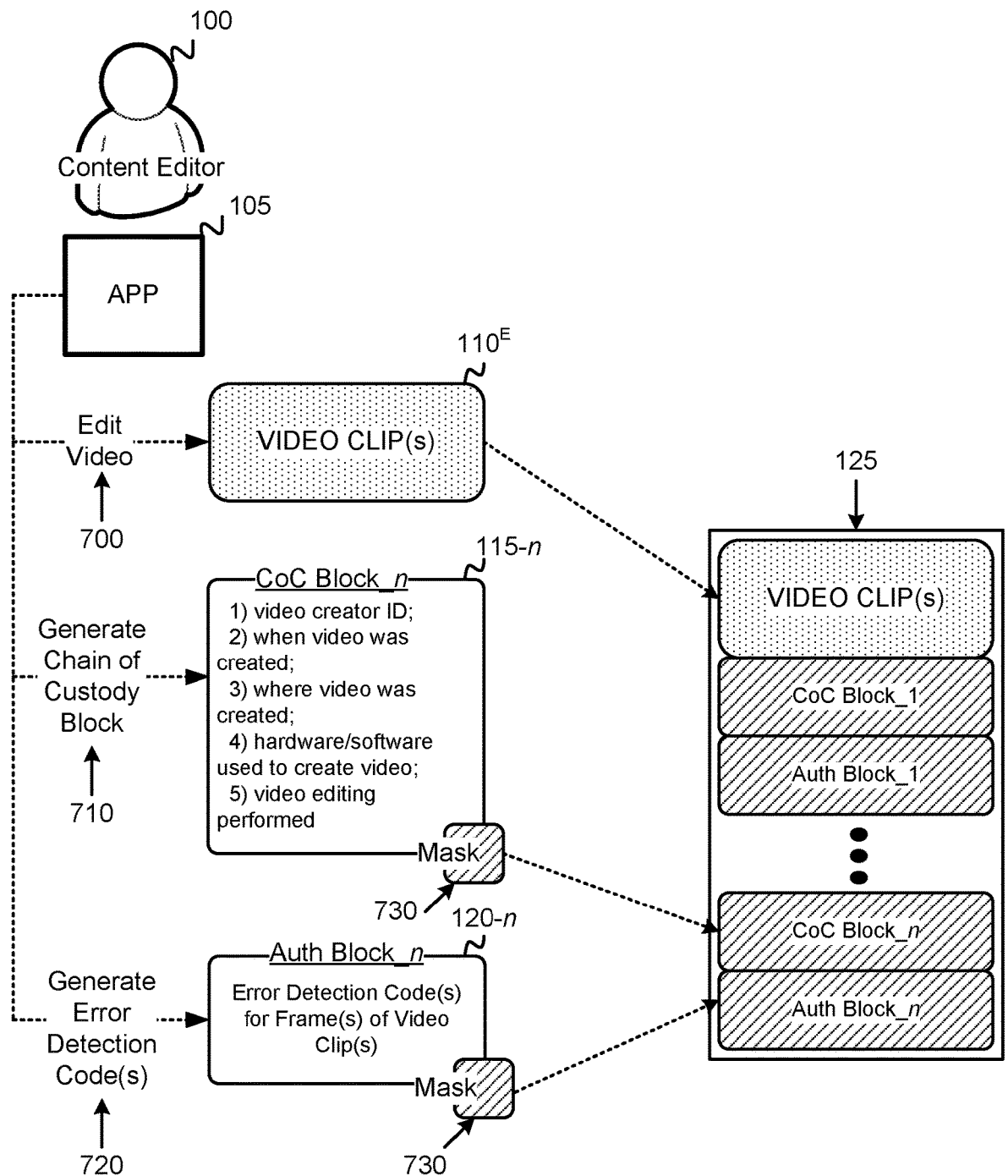
FIG. 7 graphically depicts an example of the exemplary process of FIG. 6.

The exemplary process includes an app 105 at device 205 editing a video clip (block 600). App 105 may include video editing functionality to modify a previously created video clip (e.g., as created in block 400 of FIG. 4). The video editing functionality enables the user 100 (i.e., the content editor) to perform various different types of modifications to the video clip, including, for example, adding audio to the video clip, modifying the existing audio of the video clip, cutting a section of video out of the video clip, adding a section of video into the video clip, modifying one or more frames of the video clip (e.g., modifying digitally animated objects in the video), etc. FIG. 7 depicts content editor 100, using app 105, editing 700 data content 110 that includes a video clip(s) to generate edited data content 110$^E$.

App 105 identifies context data associated with editing the video clip (block 610). In one implementation, the context data may include data describing who edited the data content and when, where, and, with what hardware and/or software, the data content was edited. For example, the context data associated with data content editing may include the following attributes:
1) an identifier (ID) of the party that edited the video clip (i.e., the user that owns, operates, and/or administers device 205 used to edit the video clip);
2) an identification of when the video clip was edited;
3) an identification of where the video clip was edited;
4) an indication of what hardware and/or software was used to edit the video clip; and/or
5) an indication of what modifications were performed on the video clip relative to a previous version of the video clip.

In other implementations, additional or different context data, than that described above, including one or more other attributes associated with editing the data content, may be identified by app 105. Upon completion of editing of the data content (e.g., video clip), app 105 obtains the context data described above. For example, the ID of the user currently using device 205 may be locally stored at device 205 and may be retrieved from memory. The current date and time, identifying when the video clip was created, may be retrieved from an internal clock at device 205, or retrieved from an external source via network(s) 230. Location device 395 may determine a location (e.g., geolocation) of device 205 to identify where the video clip was created.

App 105 may retrieve hardware identifying information for device 205 from local memory. The hardware identifying information may include, for example, a model number of device 205, an identifier associated with camera 390, etc. The various different modifications performed by app 105 upon the previous version of the video clip may be tracked and coded into different modification indicators that describe specifics of each modification that was performed on the video clip relative to the previous version of the video clip.

App 105 generates a chain of custody (CoC) block based on the context data obtained in block 410 (block 620). App 105 may code the context data, of block 610, and insert the coded context data into a CoC data block. FIG. 7 shows app 105 generating 710 a CoC block 115-$n$ that includes the context data obtained in block 610. App 105 generates error detection codes for the frames of the edited video clip and inserts the error detection codes in an authentication (Auth) block (block 630). As described above with respect to FIG. 4, various different error detection code generating algorithms may be used, such as, for example, checksum, CRC, or hash code algorithms. App 105 may generate a checksum, CRC, or hash code for each frame of the created video clip, and then inserts the generated error detection codes for the video clip into the Auth block. FIG. 7 shows app 105 generating 720 error detection codes and inserting the generated codes in an Auth block 120-$n$.

In one optional implementation, app 105 masks the CoC block and the Auth block by embedding the blocks in a digital watermark in the edited video clip using a digital watermarking technique (block 640). App 105 may, for example, embed a digital watermark, containing the CoC block and Auth block, in one or more frames of the edited video clip. Various different existing types of digital watermarking algorithms may be used for embedding the CoC block and the Auth block in the video clip. FIG. 7 depicts masking 730 of CoC block 115-1 and Auth block 120-1. Though not shown in FIG. 7, the masking 530 includes embedding CoC block 115-$n$ and Auth block 120-$n$ in a digital watermark in at least one frame of video clip(s) 110.

In another optional implementation, app 105 masks the CoC block and the Auth block by encrypting the blocks and appending the encrypted blocks to the edited video clip (block 650). App 105 may use various different existing symmetric or asymmetric cryptographic algorithms for encrypting the CoC block and the Auth block. FIG. 7 depicts masking 730 of CoC block 115-$n$ and Auth block 120-$n$ and appending the masked blocks to video clip(s) 110 to create a video data block 125.

Device 200 sends, or streams, the edited video clip to another device, or stores the video clip for retrieval by another device (block 660). Device 205 may, for example, stream the edited video clip to a destination device across network(s) 230 (such as shown in FIG. 2B). Alternatively, device 205 may store the edited video clip, with embedded or appended CoC and Auth blocks, in local memory, or in a remote storage device via network(s) 230.

Figure 8:
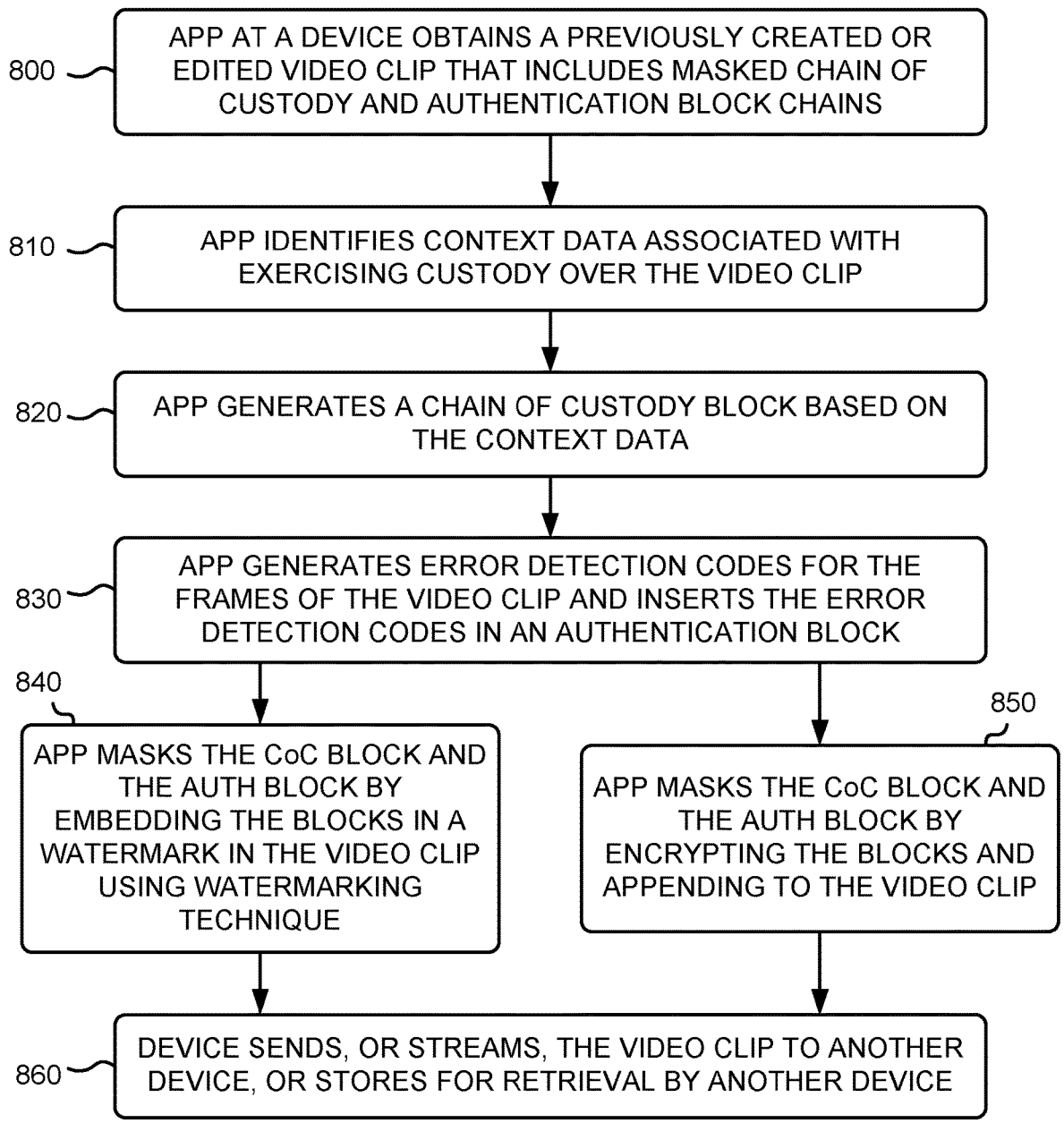
FIG. 8 is a flow diagram that illustrates an exemplary process for generating chain of custody and authentication blocks during the exercise of custody of data content by a user at a device.

FIG. 8 is a flow diagram that illustrates an exemplary process for generating chain of custody and authentication blocks during the exercise of custody of data content 110 by a particular user 100 at a particular device 205. The exemplary process of FIG. 8 may be implemented by an app 105 executed by a device 205. Though FIG. 8 describes the data content below 110 as being a video clip, the data content 100 may alternatively include images, audio files, or other types of data content (e.g., packets constituting a packet stream). The exemplary process of FIG. 8 may be executed by app 105 each time a user 100 at a device 205 exercises custody of data content 110 for any period of time. Exercising custody may include any occurrence of a device 205 obtaining and locally storing data content for a period of time. Exercising custody may not necessarily include editing or viewing the content, but may merely include, for example, receiving the data content from an external source, locally storing it temporarily at device 205, and then delivering the data content 110 to remote storage or to another device. The exemplary process of FIG. 8 is described below with reference to the graphical depiction of FIG. 9.

The exemplary process includes an app 105 at device 205 obtaining a previously created or edited video clip that includes masked chain of custody and authentication block chains (block 800). A user 100 of device 205 may retrieve from remote storage an unedited video clip previously created using the exemplary process of FIG. 4. Alternatively, the user of device 205 may retrieve from remote storage a video clip previously created using the process of FIG. 4 and previously edited, at least once, using the exemplary process of FIG. 6. Additionally, the user 100 of device 205 may cause the created or edited video clip, that includes masked CoC and Auth block chains, to be delivered or streamed from another device.

App 105 identifies context data associated with the device 205 exercising custody of the video clip (block 810). In one implementation, the context data may include data describing who exercised custody over the video clip and when, where, and, with what hardware and/or software, custody was exercised over the video clip. For example, the context data associated with the exercise of custody over the video clip may include the following attributes:

1) an ID of the party having custody of the video clip (i.e., the user that owns, operates, and/or administers device 205 used to exercise custody over the video clip);
2) an identification of when the party had custody of the video clip;
3) an identification of where the party had custody of the video clip; and/or
4) an indication of what hardware and/or software was associated with custody of the video clip.

In other implementations, additional or different context data, than that described above, including one or more other attributes associated with device 205 exercising custody over the data content, may be identified by app 105. App 105 obtains the custodial context data upon device 205 obtaining the data content from remote storage or from another device. For example, the ID of the user 100 currently having custody of the data content may be locally stored at device 205 and may be retrieved from memory. The current date and time, identifying when the identified user 100 had custody of the data content may be retrieved from an internal clock at device 205, or retrieved from an external source via network(s) 230. A location (e.g., geolocation) of device 205, at which the data content is in the custody of the user 100, may be determined. App 105 may retrieve hardware identifying information for device 205 from local memory. The hardware identifying information may include, for example, a model number of device 205, etc.

Figure 9:
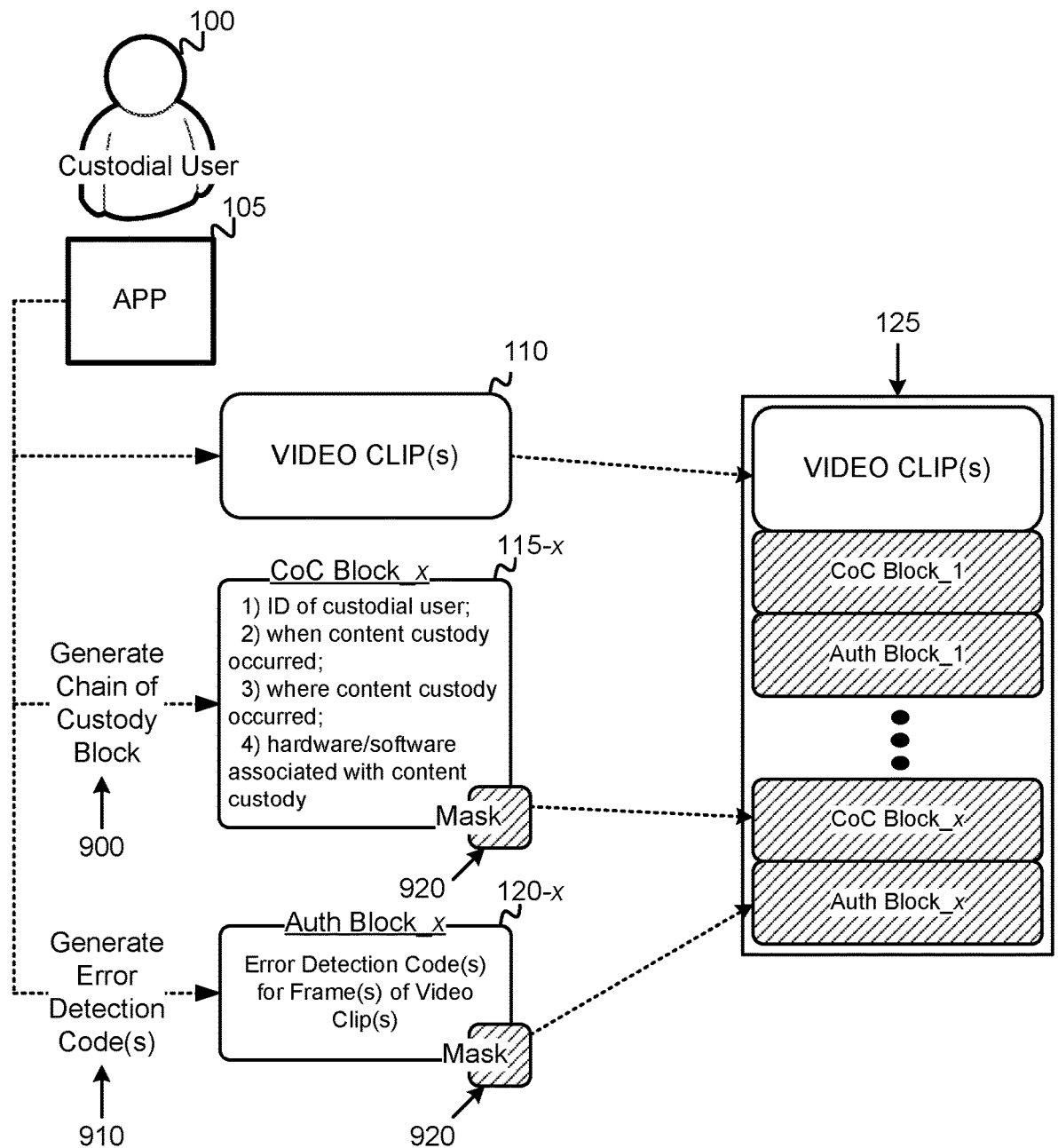
FIG. 9 graphically depicts an example of the exemplary process of FIG. 8.

App 105 generates a chain of custody (CoC) block based on the context data obtained in block 810 (block 820). App 105 may code the context data, of block 810, and insert the coded context data into a CoC data block. FIG. 9 shows app 105 generating 900 a CoC block 115-$x$ that includes the context data obtained in block 810. App 105 generates error detection codes for the frames of the video clip and inserts the error detection codes in an authentication (Auth) block (block 830). As described above, various different error detection code generating algorithms may be used, such as, for example, checksum, CRC, or hash code algorithms. App 105 may generate a checksum, CRC, or hash code for each frame of the created video clip, and then insert the generated error detection codes for the video clip into the Auth block. FIG. 9 shows app 105 generating 910 error detection codes and inserting the generated codes in an Auth block 120-$x$.

In one optional implementation, app 105 masks the CoC block and the Auth block by embedding the blocks in a digital watermark in the edited video clip using a digital watermarking technique (block 840). App 105 may, for example, embed a digital watermark, containing the CoC block and Auth block, in one or more frames of the edited video clip. As already described, various different existing types of digital watermarking algorithms may be used for embedding the CoC block and the Auth block in the video clip. FIG. 9 depicts masking 920 of CoC block 115-$x$ and Auth block 120-$x$. Though not shown in FIG. 9, the masking 530 includes embedding CoC block 115-$x$ and Auth block 120-$x$ in a digital watermark in at least one frame of video clip(s) 110.

In another optional implementation, app 105 masks the CoC block and the Auth block by encrypting the blocks and appending the encrypted blocks to the edited video clip (block 850). As already described, app 105 may use various different existing symmetric or asymmetric cryptographic algorithms for encrypting the CoC block and the Auth block. FIG. 9 depicts masking 920 of CoC block 115-$x$ and Auth block 120-$x$ and appending the masked blocks to video clip(s) 110 to create a video data block 125.

Device 200 sends, or streams, the video clip to another device, or stores the video clip for retrieval by another device (block 860). Device 205 may, for example, stream the edited video clip to a destination device across network(s) 230 (such as shown in FIG. 2B). Alternatively, device 205 may store the edited video clip, with embedded or appended CoC and Auth blocks, in local memory, or may store the edited video clip in a remote storage device via network(s) 230.

Figure 10:
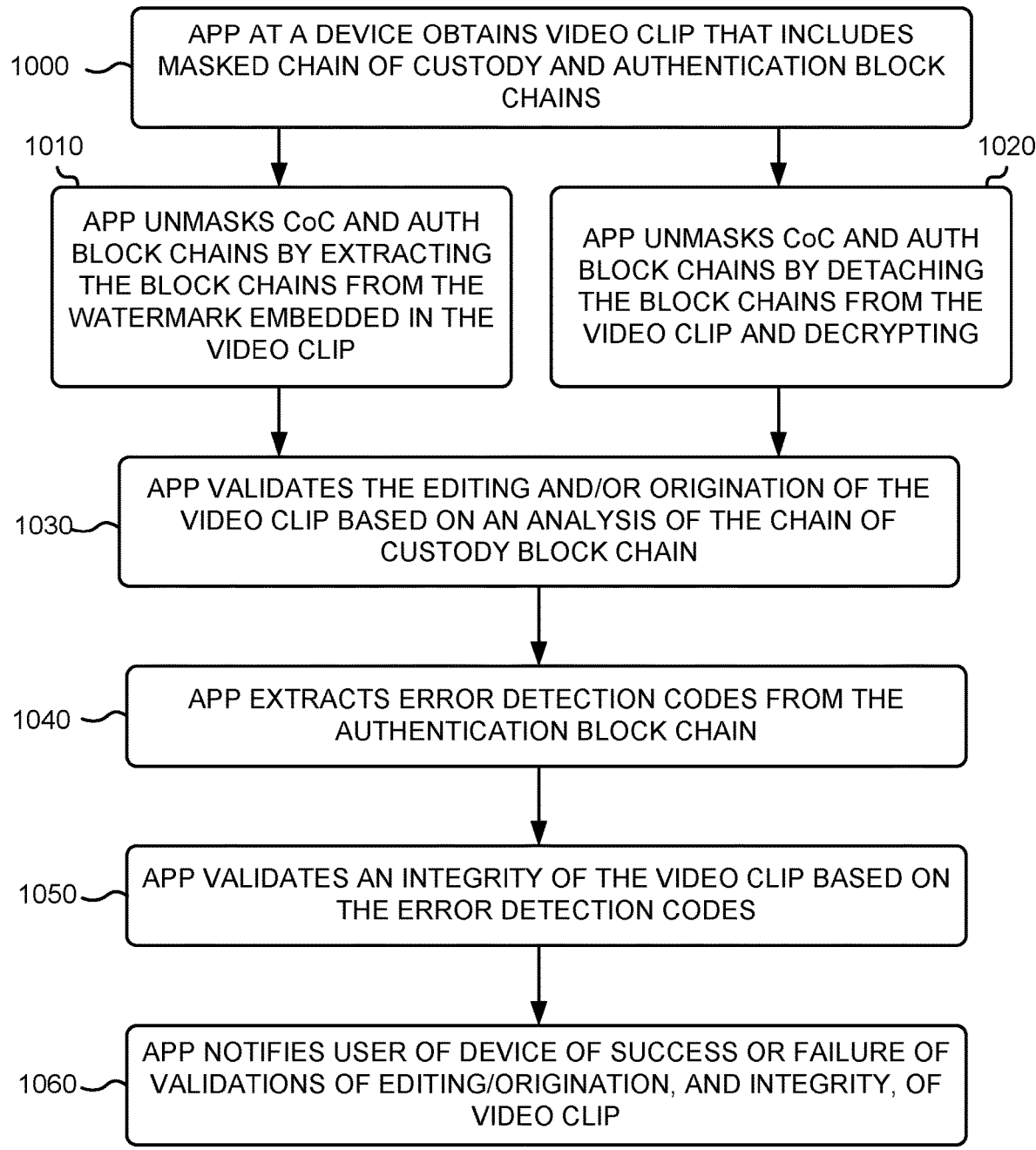
FIG. 10 is a flow diagram that illustrates an exemplary process for validating the origination, editing, and integrity of data content that includes chain of custody and authentication block chains.

FIG. 10 is a flow diagram that illustrates an exemplary process for validating the origination, editing, and integrity of data content 110 that includes chain of custody and authentication block chains. In some implementations, the exemplary process of FIG. 10 may be implemented by an app 105 executed by a device 205. In other implementations, the process of FIG. 10 may be implemented by validation server 210 or trusted device 220. Though FIG. 10 describes the data content below 110 as being a video clip, the data content 100 may alternatively include images, audio files, or other types of data content (e.g., packets constituting a packet stream). The exemplary process of FIG. 10 may be executed by app 105 each time a user 100 at a device 205 obtains data content 110 from an external source (e.g., from remote storage, from a server, from another device 205) and exercises custody of the data content (e.g., including viewing the data content 110). The exemplary process of FIG. 10 is described below with reference to the graphical depiction of FIG. 11.

Figure 11:
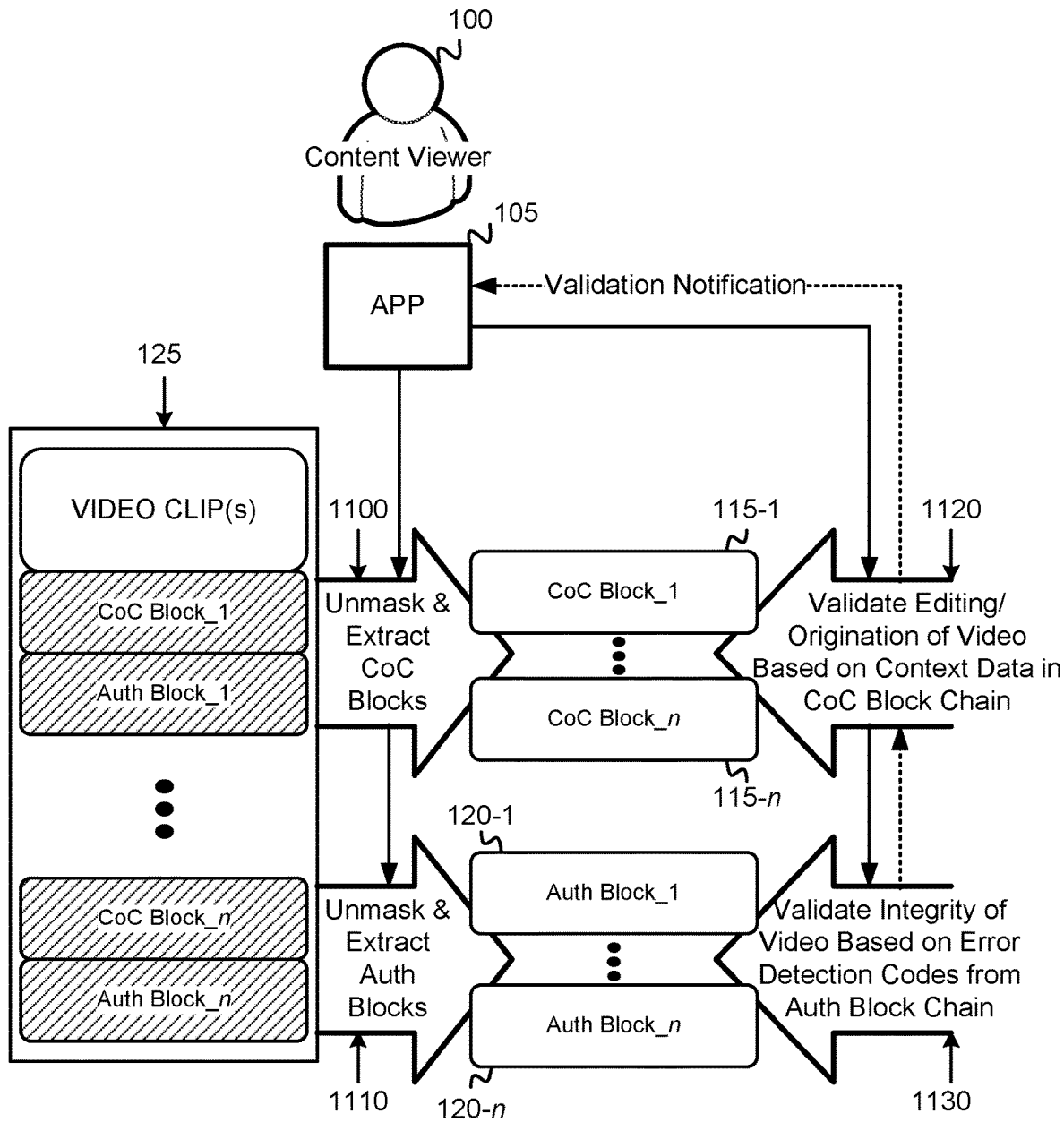
FIG. 11 graphically depicts an example of the exemplary process of FIG. 6.

The exemplary process includes an app 105 at a device 200 obtaining a video clip that includes masked CoC and Auth block chains (block 1000). For example, a user 100 of device 205 may retrieve from remote storage an unedited video clip previously created using the exemplary process of FIG. 4. As another example, the user of device 205 may retrieve from remote storage a video clip previously created using the process of FIG. 4 and previously edited, at least once, using the exemplary process of FIG. 6. As a further example, the user 100 of device 205 may cause the created/edited video clip, that includes masked CoC and Auth block chains, to be delivered or streamed from another device. FIG. 11 depicts a video clip block 125 obtained from an external source.

In one optional implementation in which a CoC block chain and an Auth block chain are embedded in the video clip 110, app 105 unmasks the CoC and Auth block chains by extracting the block chains from the watermark embedded in the video clip (block 1010). App 105 may use existing watermark extraction techniques to extract the digital watermark embedded in the video clip 110 and retrieve the CoC and Auth block chains from the extracted digital watermark. In another optional implementation in which an encrypted CoC and Auth block chains are appended to the video clip, app 105 unmasks the CoC and Auth block chains by detaching the block chains from the video clip and decrypting them to produce unencrypted CoC and Auth block chains (block 1020). If a secret key and a symmetric cryptographic algorithm were used to encrypt the CoC and Auth block chains, app 105 may use the previously distributed secret key to decrypt the block chains. If a private key and an asymmetric cryptographic algorithm were used to encrypt the CoC and Auth block chains, app 105 may use a previously distributed public key to decrypt the block chains. FIG. 11 illustrates app 105 unmasking 1100 and extracting the CoC blocks 115-1 through 115-$n$ of the CoC block chain from video clip data block 125. FIG. 11 further illustrates app 105 unmasking 1110 and extracting the CoC blocks 120-1 through 120-$n$ of the CoC block chain from video clip data block 125.

App 105 validates the editing and/or the origination of the video clip based on an analysis of the CoC block chain (block 1030). Validating the origination of the data content 110 may include retrieving the unique party IDs from each of the CoC blocks of the CoC block chain and verifying a validity of each of the retrieved party IDs. Additionally, or alternatively, a digital signature associated with each unique party ID may be retrieved, and the public key of the party identified by the party ID may be used to verify that the party's ID is authentic. Validating the editing of the data content 110 may include retrieving the context data from the CoC blocks of the CoC block chain and analyzing the context data, including analyzing the context data associated with creation of the data content and analyzing the context data associated with editing the data content. FIG. 11 depicts app 105 validating 1120 the editing and/or origination of the video clip based on CoC blocks 115-1 through 115-$n$ of the unmasked and extracted CoC block chain.

App 105 extracts error detection codes from the Auth block chain (block 1040) and validates an integrity of the video clip based on the error detection codes (block 1050). Validating the integrity of the data of data content 110 may include retrieving the error detection codes from each of the authentication blocks of the Auth block chain and analyzing the error detection codes to identify any discrepancies. Analysis of the error detection codes may include comparing error detection codes generated based on the data content 110 or $110^E$ currently being handled by app 105-3 and the error detection codes retrieved from the authentication blocks of the Auth block chain to determine if the error detection codes match one another. If the comparison of error detection codes indicates a discrepancy (i.e., the error detection codes do not match), then app 105-3 determines that the validation of the integrity of the data content 110 has failed. FIG. 11 depicts app 105 validating 1130 the integrity of the data contained within the video clip based on error detection codes retrieved from the unmasked and extracted Auth block chain.

App 105 notifies the user of device 200 of success or failure of the validations of the editing/origination, and integrity, of the video clip (block 1060). App 105 generates an editing and/or origination validation success or failure notification based on the outcome of block 1040 and generates an integrity validation success or failure notification based on the outcome of block 1050. For example, if the error detection codes contained in the authentication blocks of the Auth block chain do not match the error detection codes generated by app 105-3, using a same error detection code generation algorithm and based on the data content 110 currently stored or being processed by app 105-3, then app 105-3 may determine that the integrity validation has failed.

Based on the success or failure of the validations of the editing/origination and integrity of the video clip, app 105 may permit the user 100 of device 205 to view the video clip. For example, if the validations are successfully completed, then app 105 may perform video playback of the video clip at device 205. Alternatively, if the validations fail, then app 105 may present an error message to the user 100 of device 205, notifying the user 100 of the nature of the validation failure. Additionally, if the validations fail, app 105 may not, in some implementations, permit the video clip to be played back by user 100 at device 205. In other implementations, app 105 may permit video clip playback in circumstances where the validations have failed, but may conspicuously present an indication (e.g., "Cannot verify origination of content," or "Integrity of content may be compromised") to the user during the playback.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 6, 8, and 10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a device, previously created data content;
   unmasking and extracting one or more chain of custody (CoC) blocks stored in association with the data content, wherein the one or more CoC blocks include CoC data identifying who, when, where, and, with what hardware and/or software, created, edited, or exercised custody over the data content, and wherein unmasking and extracting the one or more CoC blocks comprises extracting the one or more CoC blocks from a watermark embedded in the data content;
   analyzing the one or more CoC blocks; and
   validating an origination of the data content based on the analysis of the one or more CoC blocks.

2. The method of claim 1, further comprising:
   displaying, by the device or by another device, the data content if the origination of the data content is successfully validated, or
   displaying, by the device or by the other device, a validation error message if validation of the origination of the data content fails.

3. The method of claim 1, wherein the CoC data includes one or more of:
   1) first data identifying a party that created, edited, or exercised custody over the data content,
   2) second data identifying when the data content was created or edited, or when the custody was exercised,
   3) third data indicating where the data content was created or edited, or where the custody was exercised,
   4) fourth data identifying hardware and/or software associated with the device associated with creating, editing, or exercising custody over, the data content, or
   5) fifth data identifying what modifications were performed on the data content if the data content was edited.

4. The method of claim 1, further comprising:
   validating editing performed on the data content based on the analysis of the one or more CoC blocks.

5. The method of claim 1, wherein the one or more CoC blocks are encrypted and appended to the data content and wherein unmasking the one or more CoC blocks comprises:
   detaching the one or more CoC blocks from the data content; and
   decrypting the one or more CoC blocks.

6. The method of claim 1, further comprising:
unmasking and extracting one or more authentication blocks stored in association with the data content, wherein the one or more authentication blocks each include at least one error detection code associated with the data content;
analyzing the at least one error detection code associated with the data content; and
validating an integrity of the data content based on the analysis of the at least one error detection code.

7. The method of claim 6, wherein unmasking the one or more authentication blocks comprises:
extracting the one or more authentication blocks from the watermark embedded in the data content.

8. The method of claim 6, wherein the one or more authentication blocks are encrypted and appended to the data content and wherein unmasking the one or more authentication blocks comprises:
detaching the one or more authentication blocks from the data content; and
decrypting the one or more authentication blocks.

9. The method of claim 6, wherein the data content comprises a video clip and wherein the at least one error detection code comprises a plurality of error detection codes, with each of the plurality of error detection codes being generated based on a respective frame of the video clip.

10. The method of claim 1, wherein the data content comprises a video clip, one or more images, or an audio file.

11. A device, comprising:
a communication interface coupled to a network and configured to obtain previously created data content via the network; and
one or more processors, or logic, to:
unmask and extract one or more chain of custody (CoC) blocks stored in association with the data content, wherein the one or more CoC blocks include CoC data identifying who, when, where, and with what hardware and/or software, created, edited, or exercised custody over the data content;
analyze the one or more CoC blocks;
validate an origination of the data content based on the analysis of the one or more CoC blocks;
unmask and extract one or more authentication blocks stored in association with the data content, wherein the one or more authentication blocks each include at least one error detection code associated with the data content;
analyze the at least one error detection code associated with the data content; and
validate an integrity of the data content based on the analysis of the at least one error detection code.

12. The device of claim 11, wherein the CoC data includes one or more of:
1) first data identifying a party that created, edited, or exercised custody over the data content,
2) second data identifying when the data content was created or edited, or when the custody was exercised,
3) third data indicating where the data content was created or edited, or where the custody was exercised,
4) fourth data identifying hardware and/or software associated with the device associated with creating, editing, or exercising custody over, the data content, or
5) fifth data identifying what modifications were performed on the data content if the data content was edited.

13. The device of claim 11, wherein the one or more processors, or logic, further:
validate editing performed on the data content based on the analysis of the one or more CoC blocks.

14. The device of claim 11, wherein, when unmasking the one or more CoC blocks, the one or more processors, or logic, further:
extracts the one or more CoC blocks from a watermark embedded in the data content.

15. The device of claim 11, wherein the one or more CoC blocks are encrypted and appended to the data content and wherein, when unmasking the one or more CoC blocks, the one or more processors, or logic, further:
detaches the one or more CoC blocks from the data content; and
decrypts the one or more CoC blocks.

16. The device of claim 11, wherein, when unmasking the one or more authentication blocks, the one or more processors, or logic, further:
extracts the one or more authentication blocks from a watermark embedded in the data content.

17. The device of claim 11, wherein the one or more authentication blocks are encrypted and appended to the data content and wherein, when unmasking the one or more authentication blocks, the one or more processors, or logic, further:
detaches the one or more authentication blocks from the data content; and
decrypts the one or more authentication blocks.

18. The device of claim 11, wherein the data content comprises a video clip and wherein the at least one error detection code comprises a plurality of error detection codes, with each of the plurality of error detection codes being generated based on a respective frame of the video clip.

19. A non-transitory storage medium storing instructions executable by a device, wherein the instructions comprise instructions to cause the device to:
obtain previously created data content;
unmask and extract one or more chain of custody (CoC) blocks stored in association with the data content, wherein the one or more CoC blocks include CoC data identifying who, when, where, and with what hardware and/or software, created, edited, or exercised custody over the data content, and wherein the CoC data further comprises a unique party identifier (ID) that identifies a party who created, edited or exercised custody over the data content and a digital signature created by digitally signing the unique party ID with a private key of a public/private key pair associated with the party;
analyze the one or more CoC blocks; and
validate an origination and/or editing of the data content based on the analysis of the one or more CoC blocks, wherein validating the origination of the data content further comprises:
using the public key of the public/private key pair associated with the party, and the digital signature, to verify that the unique party ID is authentic.

20. The non-transitory storage medium of claim 19, wherein the instructions comprise instructions to cause the device to:
display, by the device or by another device, the data content if the origination of the data content is successfully validated, or
display, by the device or by the other device, a validation error message if validation of the origination of the data content fails.

* * * * *